United States Patent [19]
Kiuchi et al.

[11] 4,382,667
[45] May 10, 1983

[54] EXPOSURE COMPENSATION INFORMATION FORMING APPARATUS FOR A CAMERA

[75] Inventors: Masayoshi Kiuchi, Yokohama; Masaharu Kawamura, Kawasaki, both of Japan

[73] Assignee: Canon Kabushiki Kaisha, Tokyo, Japan

[21] Appl. No.: 370,115

[22] Filed: Apr. 20, 1982

Related U.S. Application Data

[63] Continuation of Ser. No. 253,560, Mar. 13, 1981, abandoned.

[30] Foreign Application Priority Data

Apr. 17, 1980 [JP] Japan .................................. 55-51883

[51] Int. Cl.³ ............................................. G03B 7/085
[52] U.S. Cl. ........................................ 354/43; 354/46; 354/271
[58] Field of Search .................... 354/43, 46, 271, 286

[56] References Cited

U.S. PATENT DOCUMENTS 4,150,889  4/1979  Ueda et al. ............................ 354/37

Primary Examiner—Michael L. Gellner
Attorney, Agent, or Firm—Toren, McGeady and Stanger

[57] ABSTRACT

The present invention relates to the exposure compensation information forming apparatus for a camera, particularly for forming the aperture and the totally opened aperture value information. Until now in order to compensate the totally opened aperture value contained in the output of the light measuring circuit and the aperture value the information setting means for the totally opened aperture value and that for the aperture value are provided, whereby both setting means are mechanically engaged with each other so as to form the totally opened aperture and the aperture information. Thus, the engaging mechanism of both of the above means is complicated, which is inconvenient. The present invention provides an exposure compensation information forming apparatus by means of which the aperture information can be composed from the totally opened aperture with a very simple circuit composition so as to overcome the above disadvantage.

5 Claims, 4 Drawing Figures

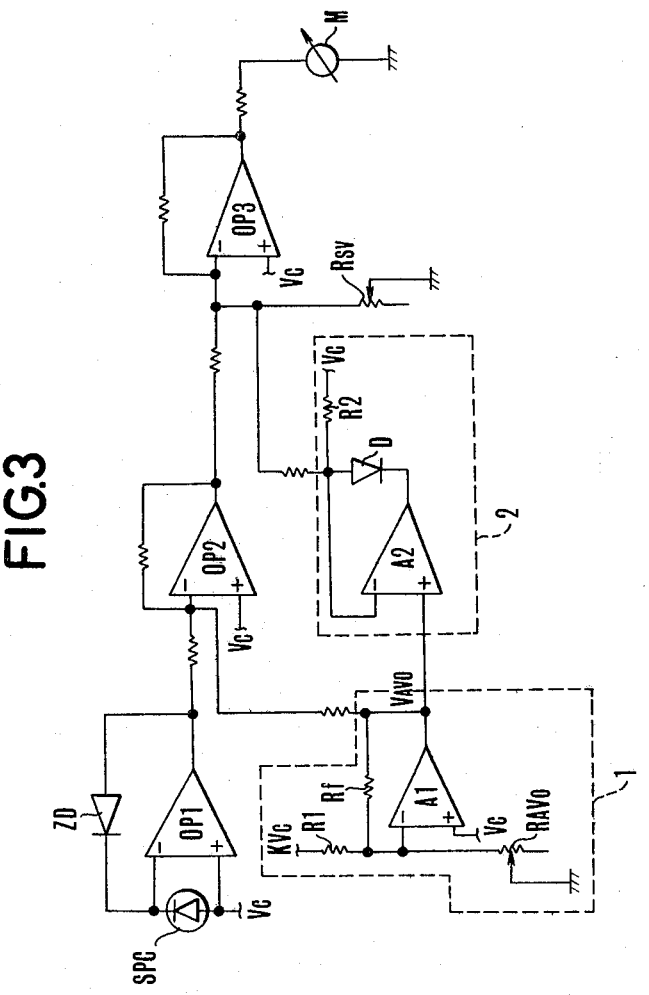

EXPOSURE COMPENSATION INFORMATION FORMING APPARATUS FOR A CAMERA

This is a continuation of application Ser. No. 253,560, filed Mar. 13, 1981, now abandoned.

BACKGROUND OF THE INVENTION

1. Field of the Invention

The present invention relates to the improvement of the light measurement compensation apparatus for the single lens reflex camera.

2. Description of the Prior Art

Generally, in the case of the so-called TTL totally opened light measuring system in accordance with which the light beam having passed through the photographing lens is directed to the light sensing element so as to measure the light amount, the object brightness BV can be calculated from the totally opened aperture compensation value AVo (F No. of the lens) and the aperture compensation value AVc and brightness BVo measured on the surface of the light sensing element as follows:

$$BV = BVo + (AVo + AVc).$$

Until now, there are two systems for calculating the object brightness from the above relation, namely, the one in accordance with which the totally opened aperture compensation value AVo and the aperture compensation value AVc are obtained independently and the other in accordance with which the aperture compensation value AVc is written in the ROM and so on. This is done while the totally opened compensation value AVo is read out from the totally opened aperture compensation signal pin of the photographing lens so as to read out the aperture compensation value AVc corresponding thereto.

In the case of one of the conventional two systems, in accordance with which the aperture compensation value AVc and the totally opened aperture compensation value AVo are obtained independently from each other, for one signal pin of the lens two variable resistances, namely, the one for the aperture compensation and the other for the totally opened aperture compensation are mechanically engaged. Thus, it is necessary to provide two systems for the engaging mechanism, which necessarily becomes complicated, while it is also necessary to carry out the adjustment in such a manner that the two systems for the engaging mechanism assume a certain determined relation with each other. This causes the decrease of fidelity by adjustment and the increase of manufacturing cost, which is disadvantageous. Further, the case of the system in which the second ROM and so on are used, the calculation circuit becomes complicated and, therefore, it is difficult to cut the manufacturing cost, which is disadvantageous.

SUMMARY OF THE INVENTION

An object of the present invention is to provide an information forming apparatus for a camera, so designed that a first circuit for providing a voltage corresponding to the totally opened aperture compensation value AVo and a limiter circuit for transmitting only the output lower than a certain determined level, of the above circuit, are provided. Accordingly, AVo is obtained from the first circuit, while AVc information voltage is obtained from the limiter circuit as an output in such a manner that AVo and AVc informations are obtained by means of a very simple construction.

Further objects of the present invention will be obvious from the explanations to be made below in accordance with the drawings of an embodiment.

BRIEF DESCRIPTION OF THE DRAWINGS

FIG. 3 shows an embodiment of the circuit of a camera to which the present invention applies.

DESCRIPTION OF THE PREFERRED EMBODIMENT

Below, the present invention will be explained in accordance with an embodiment. The present invention is based upon the approximation between the aperture compensation value AVc and the totally opened aperture compensation value AVo, namely $$AVc = K(C - AVo) \geqq 0$$

whereby
K:proportion constant,
C:constant.

Figure 1:
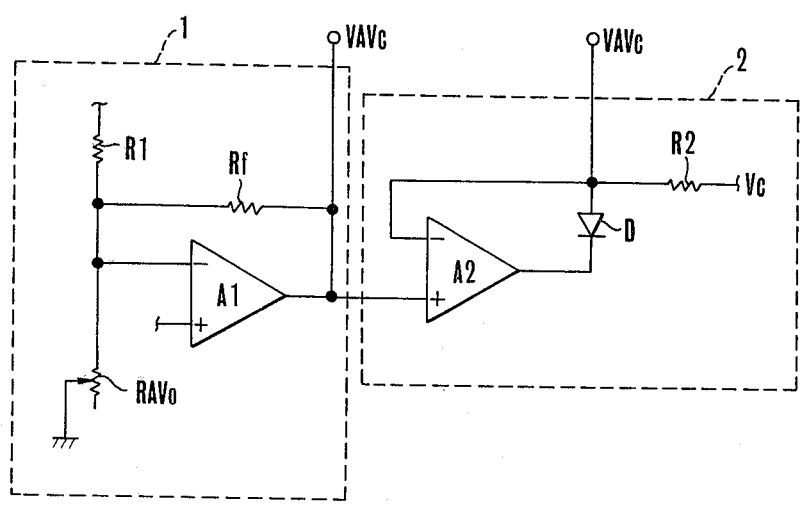
FIG. 1 shows an embodiment of the light measurement compensation circuit of the light measurement compensation apparatus in accordance with the present invention, for a camera.

FIG. 1 shows an embodiment of the light measurement compensation apparatus in accordance with the present invention for the single lens reflex camera. In the drawing, element 1 is the information voltage producing circuit for producing the totally opened aperture compensation voltage VAVo corresponding to the totally opened aperture compensation value AVo and element 2 is the limiter circuit, which is supplied with the totally opened aperture compensation information voltage VAVo so as to produce the aperture compensation information voltage VAVc not higher than the standard voltage Vc. In the information voltage producing circuit 1, A1 is the operational amplifier, to whose non-inverting input terminal a constant voltage Vc is applied. RAVo is the totally opened aperture compensation information variable resistance whose value is adjusted in accordance with the projection amount of the totally opened aperture compensation pin of the photographing lens, which projection amount is different in accordance with the F value of the photographing lens.

The slide element of the variable resistance RAVo, to which a constant voltage KVc is applied through the resistance R1, is grounded. The constant voltage KVc is set higher than the constant voltage Vc. The connecting point of the resistance R1 with the variable resistance RAVo is connected to the inverting input of the operational amplifier A1. Rf is the feed back resistance connected between the inverting input of the operational amplifier A1 and the output, whereby the output of the operational amplifier A1 is applied as the totally opened aperture compensation information voltage VAVo to the operation circuit of the camera (not shown in the drawing) and to the limiter circuit 2, in which circuit A2 is the operational amplifier, to whose non-inverting input the totally opened aperture compensation information voltage VAVo is applied from the operational amplifier A1. D is the diode to whose cathode the output of the operational amplifier A2 is connected and to whose anode the constant voltage Vc is applied through the resistance R2. The connecting point of the diode D with the resistance R2 is connected to the non-inverting input of the operational amplifier A2, whereby the potential of the connecting point is applied as the aperture compensation information voltage VAVc to the operation circuit of the camera not shown in the drawing. The relation between VAVc and AVc is VAVc=f(−AVc).

Below, the operation of the above composition will be explained.

Figure 2A:
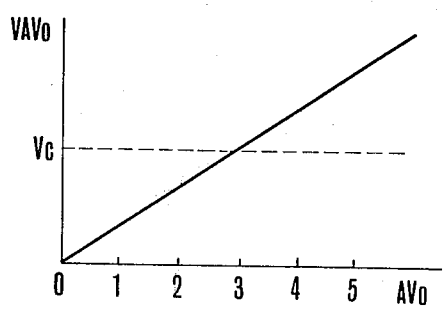
FIG. 2(a) shows the characteristic curve for the totally opened aperture compensation information voltage VAVo of the circuit shown in FIG. 1.
Figure 2B:
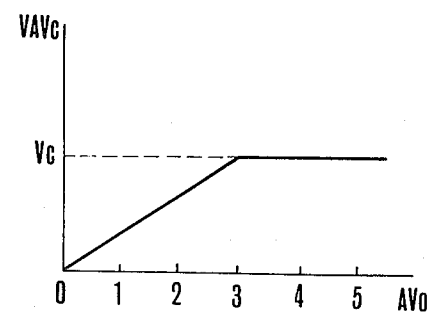
FIG. 2(b) shows the characteristic curve for the aperture compensation information voltage VAVc of the limiter circuit shown in FIG. 1.

The value of the variable resistance RAVc is set in accordance with the F value of the photographing lens mounted on the camera, so as to decide the output voltage VAVo of the operational amplifier A1, whereby the smaller the F value of the photographing lens, the larger the value of the variable resistance RAVc is. Thus, the smaller the F value of the photographing lens is, the lower the output voltage VAVo of the operational amplifier A1 is, as is shown in FIG. 2(a) in such a manner when the Apex value of the F value is 3, the output voltage of the operational amplifier A1 is Vc. The output voltage of the operational amplifier A1 is applied as the totally opened aperture compensation information voltage VAVc to the operation circuit of the camera not shown in the drawing and to the non-inverting input of the operational amplifier A2. Because the operational amplifier A2 constitutes the limiter circuit 2 together with the diode D the output voltage of the operational amplifier A1, which is lower than the standard voltage Vc is taken out, so that the potential at the connecting point of the resistance R2 with the diode D in accordance with the output voltage of the operational amplifier A2 corresponding to the change of the F value of the photographing lens is as is shown in FIG. 2(b), when the F value of the photographing lens is larger than AVo=3, the voltage becomes constant (Vc). The potential at the connecting point of the resistance R2 with the diode D is applied as the aperture compensation information voltage VAVc to the operation circuit of the camera (not shown in the drawing).

Because, as is mentioned above, the relation between VAVc and AVc is negative, when the value AVo is smaller than 3 AVc=f(−AVo). Now let us suppose that when VAVc=Vc, Avc=0. Then, when AVo is larger than 3, AVc=0, while when AVo is smaller than 3, Avc=K(C−AVo). Thus, the above-mentioned approximation, AVc=K(C−AVo)≧0 is satisfied. Namely, the AVc information can be calculated from AVo very simply.

FIG. 3 shows an embodiment of the light measuring circuit applied to the compensation apparatus shown in FIG. 1. In the drawing, elements 1 and 2 are the compensation apparatus shown in FIG. 1. OP1 is the operational amplifier, between whose inputs the light sensing element SPC for TTL totally opened light measurement is connected and in whose feed back circuit the logarithmically compressing diode ZD is inserted. OP2 and OP3 are the calculating operational amplifier, Rsv is the variable resistance to which the film sensitivity information −Sv is set and M is the display meter.

Below, the operation of the circuit shown in FIG. 3 will be explained.

Because the light sensing element SPC is for the TTL totally opened light measurement, the operational amplifier OP1 produces the output BVo (=Bv−AVo−AVc), (Bv:brightness value, BVo:TTL totally opened light measurement output). Further, because the circuit 1 produces the output VAVo corresponding to AVo, while VAVo(=AVo) and BVo are applied to the inverting input of the operational amplifier OP1, which produces the output −BVo−AVo (=−Bv+AVo+AVc−AVo=−Bv+AVc) to be transmitted to the inverting input terminal of the operational amplifier OP2. Because, on the other hand, the circuit 2 produces VAVc, while on the resistance $R_{sv}$ the film sensitivity information −So is set, to the inverting input of the operational amplifier OP3, VAVc and −Sv are applied beside −Bv+AVc. Thus, the operational amplifier OP3 produces Bv−AVc−VAVc+Sv. Further, the relation between VAVc and AVc is negative, so that the operational amplifier OP3 produces Bv−AVc+AVc+Sv=Bv+Sv(=Ev), so as to apply Ev (Exposure value) to the meter, which displays the Ev value.

As is explained above in detail, in accordance with the present invention, it is taken into consideration that there exists an approximation between AVc and AVo in such a manner that a circuit for producing the voltage corresponding to AVo and a limiter circuit for allowing the passage of the output of the circuit below a certain determined level Vc are provided, whereby the limiter circuit produces the voltage corresponding to AVc. Thus, as is different from the conventional apparatus, without making use of either the complicated mechanism or the logic circuit, a circuit with high fidelity can be obtained in a very easy way. This contributes much to the realization of a very effective light measurement compensation apparatus for the camera.

What is claimed is:

1. An exposure compensation information forming apparatus for a camera comprising:
    (a) a first circuit for producing an electrical output corresponding to a value AVo;
    (b) a limiter circuit connected to the first circuit, said circuit forming an output corresponding to the output of the first circuit and limiting the output of the first circuit to a certain determined value so as to produce a signal corresponding to the determined value when the output of the first circuit becomes a predetermined relation to the determined value, whereby an output signal corresponding to AVc value information is produced as the output of the limiter circuit.

2. An exposure compensation information forming apparatus for a camera comprising:
    (a) a first circuit for producing an electrical output corresponding to a value AVo;
    (b) a second circuit connected to the first circuit, said circuit detecting the output of the first circuit so as to produce an output corresponding to the output of the first circuit and also produce an output corresponding to a certain determined level independently of the output level of the first circuit when the output of the first circuit trespasses a certain determined level, whereby an output corresponding to AVc value information is formed as the output of the second circuit.

3. An exposure compensation information forming apparatus for a camera comprising:

(a) a setting means for setting the totally opened aperture information;
(b) a first circuit for forming the output voltage corresponding to the totally opened aperture information set to the setting means; and
(c) a second circuit connected to the output of the first circuit, said circuit being supplied with a standard voltage and comparing the output voltage of the first circuit with the standard voltage so as to form an output corresponding to the output voltage as the aperture compensation signal AVc when the output voltage of the second circuit is lower than the standard voltage and an output corresponding to the standard voltage as the aperture compensation signal AVc when the output voltage of the second circuit is higher than the standard voltage.

4. An exposure information forming apparatus for a camera comprising:
(a) a resistance means for setting the totally opened aperture information;
(b) a first operational amplifier to whose input the resistance means is connected, said amplifier forming an output voltage corresponding to the totally opened aperture value as output; and
(c) a second operational amplifier, to the input of said amplifier the output voltage of the first operational amplifier being applied, while to the output of said amplifier a standard voltage being applied through a one way conductive element, whereby when the output of the first operational amplifier is lower than the standard voltage the output of the first operational amplifier is formed as the information corresponding to the AVc value through the one way conductive element, while when the output of the first operational amplifier is higher than the standard voltage the standard voltage is formed as the information corresponding to the AVc value.

5. A camera comprising:
(a) a light measuring circuit having a light sensing element, said light sensing element sensing the object light beam incident through a lens in the totally opened state of the aperture;
(b) a first circuit having a setting means for setting the totally opened aperture information, said first circuit forming an output corresponding to the set totally opened aperture value;
(c) a second circuit connected to the first circuit, said circuit detecting the output voltage of the first circuit so as to form a voltage corresponding to the output voltage of the first circuit as an aperture value information AVc and a voltage with a certain determined voltage as the aperture value information when the output voltage of the first circuit trespasses a certain determined voltage; and
(d) a calculation circuit, said circuit calculating the output of the light measuring circuit and that of the first and the second circuit so as to exclude the influence of the totally opened aperture value and the aperture value contained in the output of the light measuring circuit.

* * * * *